United States Patent Office 3,253,811
Patented May 31, 1966

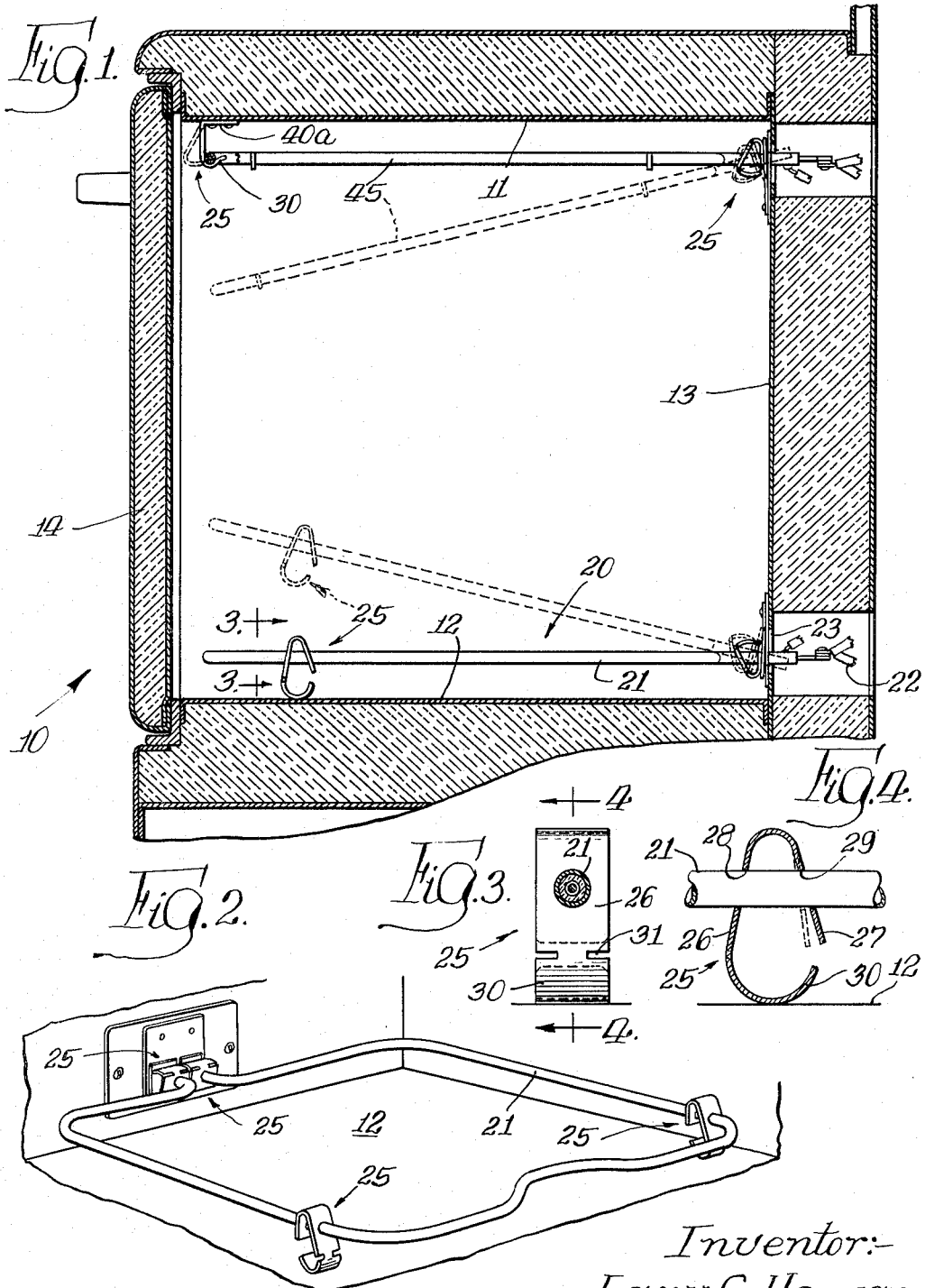

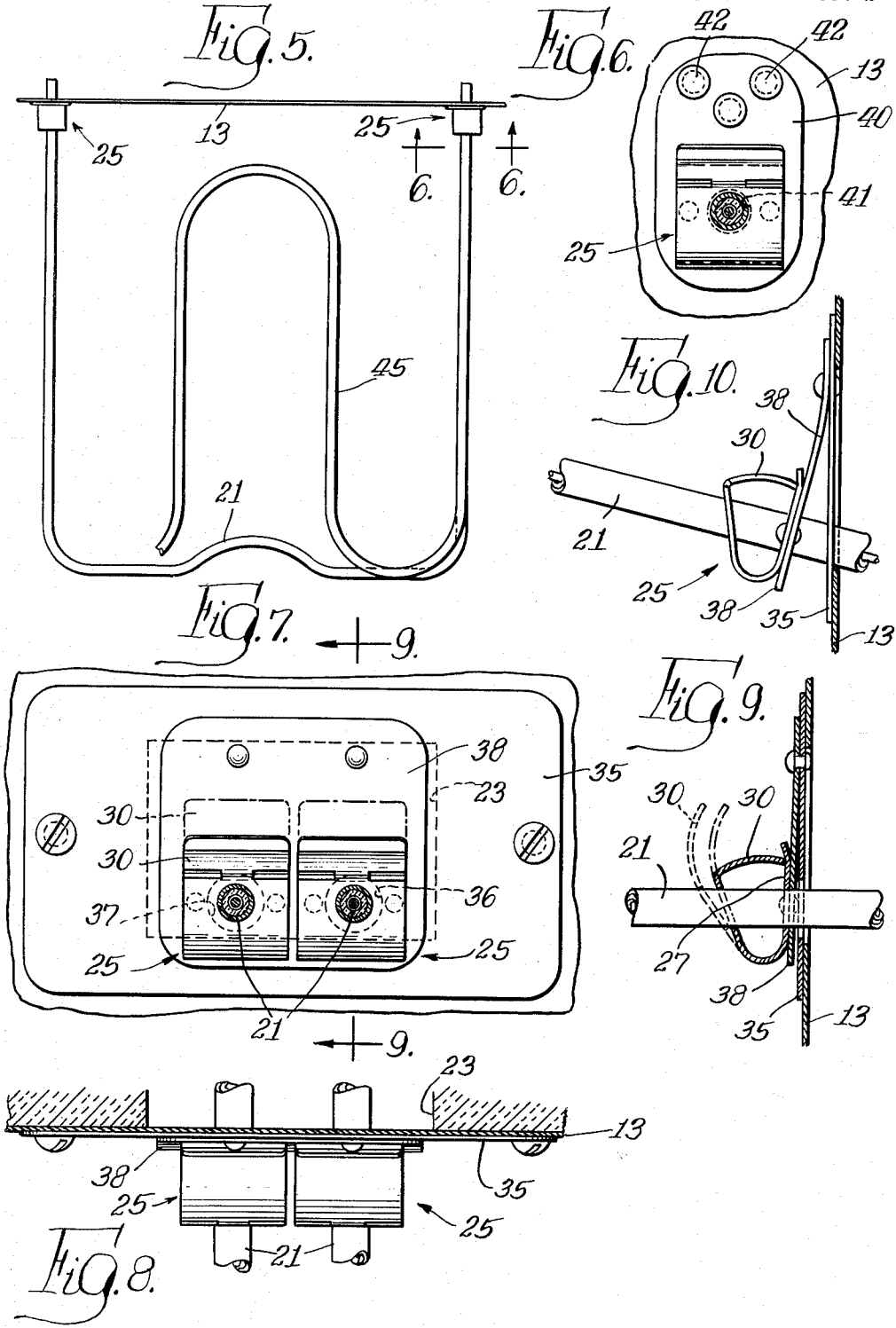

3,253,811
SUPPORT FOR SHEATHED ELECTRICAL
HEATING ELEMENT
Leroy C. Hanson, Elmhurst, Ill., assignor to Ferro
Corporation, a corporation of Ohio
Filed Jan. 22, 1965, Ser. No. 427,275
4 Claims. (Cl. 248—49)

This application relates to a support for a sheathed electrical heating element and more particularly to a support to be used in conjunction with sheathed electrical heating elements used as broil or bake units in ovens.

It is a general object of the present invention to produce a new and improved support of the character described.

It is a more specific object of the present invention to produce a support of the character described fabricated of springy material so that it may be readily positioned in supporting relationship to an electrical heating element.

More particularly, it is an object of the invention to produce a support comprising a member of springy material such as spring steel, formed generally in the shape of a V and provided with apertures in each leg which, when the legs of the V are compressed toward each other, are aligned for insertion of the element and when the legs are released, the springiness of the material serves to grip the heating element and maintain the support and element in predetermined relationship.

Other and further objects and advantages of the present invention will be readily apparent from the following description and drawings, in which:

FIG. 1 is a vertical sectional view of an oven embodying supporting elements constructed in accordance with the present invention;

FIG. 2 is a perspective view of a lower portion of the oven of FIG. 1;

FIG. 3 is a sectional view taken along line 3—3 of FIG. 1;

FIG. 4 is a vertical sectional view taken along line 4—4 of FIG. 3;

FIG. 5 is a top elevational view of a slightly modified form of heating element;

FIG. 6 is a bottom elevational view of the support for holding the broiler unit in position;

FIG. 7 is an enlarged view showing a portion of the rear wall of the oven together with a mounting plate and the supports of the present invention;

FIG. 8 is a horizontal section of the apparatus shown in FIG. 7;

FIG. 9 is a vertical section taken along line 9—9 of FIG. 7; and

FIG. 10 is a side elevational view of the apparatus shown in FIG. 9.

While this invention is susceptible of embodiment in many different forms, there is shown in the drawings and will herein be described in detail an embodiment of the invention together with modifications thereof with the understanding that the present disclosure is to be considered as an exemplification of the principles of the invention and is not intended to limit the invention to the embodiment illustrated. The scope of the invention will be pointed out in the appended claims.

Referring now to FIGS. 1-4 of the drawings, there is shown an oven 10 having a top 11, a floor 12, a rear wall 13, and a door 14. Located within the oven is a bake unit 20 comprising a sheathed electrical heating element 21 having terminals 22 extending through an aperture 23 in the rear wall of the oven. Supporting the heating element 21 is a support member generally designated 25 made of springy material, such as spring steel, in the form of a V and having a pair of legs 26 and 27. Each of the legs is provided with an aperture 28, 29 through which the heating element 21 may extend. Integrally attached to the leg 26 is a curved portion 30 with the curved portion being attached along a line of weakness formed by the diametrically opposite slots 31.

In fixing the support 25 on the sheathed element 21 the legs 26 and 27 are bent toward each other so as to align the apertures 28 and 29 therein. With the apertures so aligned, the element is inserted therethrough and the support moved along the element to its desired position. When the pressure is released, the legs tend to spring apart causing the edges of the apertures therein firmly to grip the exterior surface of the heating element, thereby maintaining the two parts in predetermined fixed relationship.

The support of the present invention is also used to support the heating element adjacent the rear wall of the oven. As best shown in FIGS. 7-10, there is provided a mounting plate 35 having a pair of apertures 36 and 37 therethrough. Carried by the mounting plate is a spring plate 38 secured to the mounting plate only along its top edge and thus being bendable to act in the nature of a hinge as hereinafter described. The shorter legs 27 of a pair of supports 25 are secured to the spring plate and the ends of the heating element 21 may be inserted through the apertures when they are aligned by pressing the legs of the member 25 toward each other. After the heating element has been inserted through the supports 25 to the position desired, the curved portion 30 of each of the supports may be bent along the line of weakness to the position shown in FIGS. 9 and 10, thereby locking the supports in gripping supporting position, inasmuch as the curved portion 30 prevents the legs from moving toward each other to release the grip the edges of the apertures exert on the heating element. When it is desired to clean the floor of the oven the unit may be tilted as illustrated in FIG. 10, pivoting about the hinge formed by the resilient spring plate 38.

If the oven is of such construction as to take a bake or broil unit of the type shown in FIG. 5, each of the supports 25 may be secured to individual mounting plates 40 provided with suitable apertures 41 through which the heating element 21 may extend and be secured to the rear wall 12 of the oven by means of the attaching devices 42 as shown.

The versatility of the support on mounting clip of the present invention is further demonstrated by its additional use as a means for securing a broil unit to the top of the oven. For this purpose, a mounting plate similar to the plate 40 (designated 40a) is secured to the top 11 of the oven in the manner illustrated in FIG. 1. The mounting clip is in turn secured to the plate 40a and the heating element is supported by resting on the bendable portion 30. When it is desired to pivot the broil unit downwardly, the clip is swung out of the way to the dotted line position shown in FIG. 1 and the element is swung downwardly as illustrated. The pivoting action is permitted by the utilization of a mounting plate, spring plate, and clip thereon, as previously described. For use in the upper portion of the oven (as shown in the upper portion of FIG. 1), the mounting plate and spring plate are inverted to permit downward pivoting instead of the upward pivoting permitted in the apparatus shown in FIGS. 7-10.

I claim:
1. A support for a sheathed electrical oven heating element comprising a member of springy material having generally the shape of a V, a curved portion integrally connected to the end of one leg of the V-shaped member, said portion being adapted to contact the floor of the oven to support the element a predetermined distance above the floor, an aperture in each leg of the V-shaped member with said apertures being normally mis- aligned and being alignable by bending the legs of the member toward each other, whereby an end of the sheathed element may be inserted through the aligned apertures as the legs are bent toward each other and the resiliency of said material will cause the edges of the apertures to grip the sheathed element when said legs are released.

2. A support for a sheathed electrical oven heating element comprising a member of springy material having generally the shape of a V, an aperture in each leg of the V-shaped member with said apertures being normally misaligned and being alignable by bending the legs of the member toward each other, whereby an end of the sheathed element may be inserted through the aligned apertures as the legs are bent toward each other and the resiliency of said material will cause the edges of the apertures to grip the sheathed element when said legs are released, means for securing one leg of the V to the rear wall of the oven, a curved portion integrally connected to the end of the other leg of the V- shaped member, said curved portion being permanently bendable toward said one leg to prevent said legs being movable toward each other, thereby preventing release of said element after it has been inserted through said apertures.

3. The support of claim 2 in which said curved portion is connected to the end of said other leg along a weakened area.

4. A support for a sheathed electrical oven heating element comprising a mounting plate to be secured to the rear wall of the oven, a spring plate secured along its upper edge to the mounting plate, a member of springy material being generally in the shape of a V, one leg of the V being secured to said spring plate, an aperture in each leg of the V-shaped member with said apertures being normally misaligned and being alignable by bending the legs of the member toward each other, whereby an end of the sheathed element may be inserted through the aligned apertures as the legs are bent toward each other and the resiliency of said material will cause the edges of the apertures to grip the sheathed element when said legs are released.

References Cited by the Examiner

UNITED STATES PATENTS

| | | | |
|---|---|---|---|
| 868,669 | 10/1907 | Knapp | 248—359 |
| 1,505,220 | 8/1924 | Shay | 24—243.12 |
| 2,089,452 | 8/1937 | Utley | 248—42 |
| 2,614,779 | 10/1952 | Peterson et al. | 248—44 |
| 2,634,473 | 4/1953 | Price | 24—81 |
| 2,851,823 | 9/1958 | Paterson | 47—47 |
| 2,875,313 | 2/1959 | King | 219—520 |
| 2,914,283 | 11/1959 | Jorgensen | 248—125 |
| 2,922,017 | 1/1960 | Ripley | 219—520 |
| 2,961,479 | 11/1960 | Bertling | 174—43 |
| 3,052,004 | 9/1962 | Wallshein | 248—307 X |

CLAUDE A. LE ROY, *Primary Examiner.*